(12) United States Patent
Kuhlman et al.

(10) Patent No.: US 8,379,302 B2
(45) Date of Patent: Feb. 19, 2013

(54) INFRARED LIGHT DISTRIBUTION PATTERN CONTROL USING OBJECT DETECTION AND ELECTROWETTING DEVICES

(75) Inventors: Frederick F. Kuhlman, Kokomo, IN (US); Dwadasi H.R. Sarma, Kokomo, IN (US); Nasser Lukmani, West Bloomfield, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/163,993

(22) Filed: Jun. 20, 2011

(65) Prior Publication Data

US 2012/0319016 A1 Dec. 20, 2012

(51) Int. Cl.
*F21V 9/04* (2006.01)
(52) U.S. Cl. .......................... 359/358; 359/665; 359/832
(58) Field of Classification Search .................. None
See application file for complete search history.

(56) References Cited

U.S. PATENT DOCUMENTS

| | | | |
|---|---|---|---|
| 4,783,141 A * | 11/1988 | Baba et al. ................ | 359/619 |
| 2008/0158360 A1 | 7/2008 | Katou et al. | |
| 2008/0174846 A1 * | 7/2008 | Morozumi et al. ............ | 359/228 |
| 2008/0277480 A1 * | 11/2008 | Thuries et al. ............ | 235/472.01 |
| 2009/0195850 A1 * | 8/2009 | Takahashi .................. | 359/226.3 |
| 2010/0046004 A1 * | 2/2010 | Lee et al. ..................... | 356/603 |
| 2010/0110532 A1 | 5/2010 | Takemoto et al. | |
| 2011/0002677 A1 | 1/2011 | Cochran et al. | |

FOREIGN PATENT DOCUMENTS

DE 4316829 11/1994

OTHER PUBLICATIONS

Technical Disclosure "Adjustable car headlights using electrowetting lens", Disclosed Anonymously, Nov. 29, 2005, 4 pages, IP.com No. IPCOM000132016D, www.ip.com.
Smith, et al.: "Agile wide-angle beam steering with electrowetting microprisms", vol. 14, No. 14/Optics Express 6557, Jul. 10, 2006, 7 pages.
Heikenfeld, Jason, "Electrowetting optics on target for record optical performance", SPIE Newsroom 10.117/2.1200802.1017, 2008, 2 pages.
U.S. Appl. No. 13/106,402, filed May 12, 2011, entitled "Light Distribution Pattern Control Using Object Detection and Electrowetting Lenses".
European Search Report dated Oct. 9, 2012.

* cited by examiner

*Primary Examiner* — Derek S Chapel
(74) *Attorney, Agent, or Firm* — Lawrence D. Hazelton

(57) ABSTRACT

A system for controlling an infrared light distribution pattern that includes an electrowetting lens arranged proximate to an infrared light source, and operable to vary a distribution pattern of infrared light from the infrared light source into an area; an electrowetting shutter overlaying the electrowetting lens, and operable to an opaque state where infrared light from the infrared light source is blocked from projecting into at least a portion of the area, and operable to a transparent state where infrared light passes through the electrowetting shutter; an object detector configured to detect an object in the area; and a controller configured to receive a detection signal from the object detector, and operate the electrowetting lens and the electrowetting shutter in order to control the infrared light distribution pattern based on a location of the object. The pattern may be uniform or may be customized for the object being heated.

18 Claims, 4 Drawing Sheets

INFRARED LIGHT DISTRIBUTION PATTERN CONTROL USING OBJECT DETECTION AND ELECTROWETTING DEVICES

TECHNICAL FIELD OF INVENTION

The invention generally relates to controlling an infrared light distribution pattern of infrared light from an infrared light source, and more particularly relates to controlling that light distribution pattern using electrowetting devices and based on detecting an object proximate to an area potentially illuminated by the infrared light.

BACKGROUND OF INVENTION

Infrared light or infrared heating may be used to heat an object. For example it may be used in bathrooms or infrared based saunas to heat the occupants, or to remove ice from the wings of aircraft. Infrared light may be used for cooking and heating food as it predominantly heats the opaque, absorbent objects, rather than the air around them. Infrared light may also be used by industrial manufacturing processes for curing of coatings, forming of plastics, annealing, plastic welding, and print drying. In these applications, infrared light sources replace convection ovens and contact heating. Efficiency is achieved by matching the wavelength of the infrared heater to the absorption characteristics of the material. A problem is that infrared light sources lack ability to dynamically shape the emitted infrared light distribution pattern based on personalization or changing conditions.

SUMMARY OF THE INVENTION

In accordance with one embodiment of this invention, a system for controlling an infrared light distribution pattern is provided. The system includes an electrowetting lens, an electrowetting shutter, an object detector, and a controller. The electrowetting lens is arranged proximate to an infrared light source. The electrowetting lens is operable to vary a distribution pattern of infrared light from the infrared light source into an area. The electrowetting shutter overlays the electrowetting lens. The electrowetting shutter is operable to an opaque state where infrared light from the infrared light source is blocked from projecting into at least a portion of the area, and is operable to a transparent state where infrared light passes through the electrowetting shutter. The object detector is configured to detect an object in the area. The controller is configured to receive a detection signal from the object detector. The controller is further configured to operate the electrowetting lens and the electrowetting shutter in order to control the infrared light distribution pattern based on a location of the object.

In another embodiment of the present invention, a controller for an infrared light distribution pattern control system configured to selectively illuminate an area is provided. The controller includes a lens signal output, a shutter signal output, an input and a processor. The lens signal output is configured to control an electrowetting lens operable to vary an infrared light distribution pattern of infrared light from an infrared light source into an area. The shutter signal output is configured to control an electrowetting shutter operable to selectively block infrared light from the infrared light source. The input is configured to receive a detection signal from an object detector operable to detect a location of an object in the area. The processor is configured to determine the lens signal and the shutter signal based on the detection signal in order to control the infrared light distribution pattern in the area based on the location of the object.

In yet another embodiment of the present invention, a method for controlling an infrared light distribution pattern is provided. The method includes providing an infrared light source operable to emit infrared light. The method includes providing an electrowetting lens operable to vary a distribution pattern of infrared light from the infrared light source arriving in an area. The method includes providing an electrowetting shutter operable to selectively block the infrared light from projecting into at least a portion of the area. The method includes detecting an object location of an object. The method includes determining an infrared light distribution pattern based on the object location. The method includes operating the electrowetting lens and the electrowetting shutter in order to control the infrared light distribution pattern in the area.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
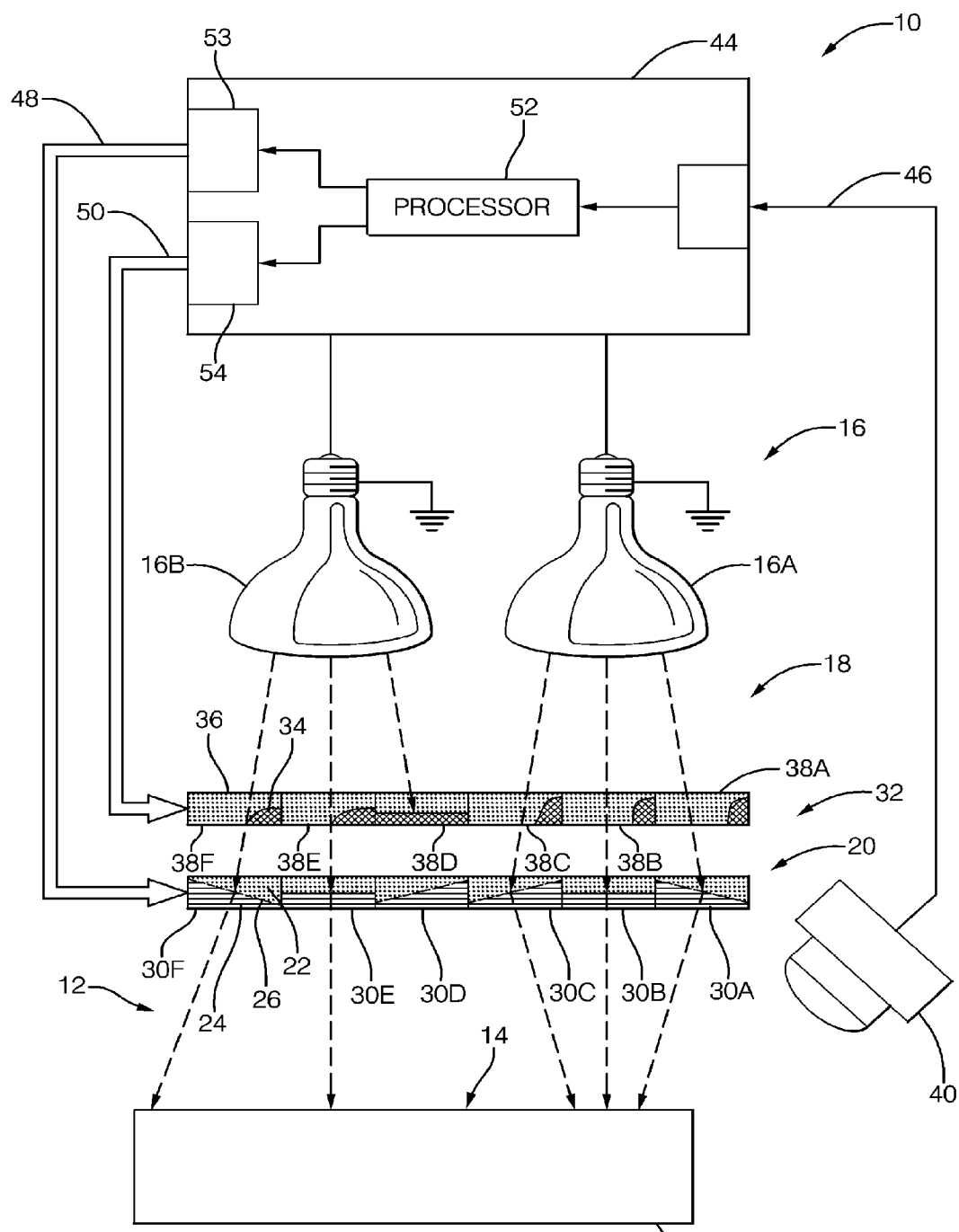
FIG. 1 is a functional diagram of an infrared light distribution pattern control system in accordance with one embodiment.

FIG. 1 illustrates a non-limiting example of a system 10 for controlling an infrared light distribution pattern 12 into an area 14. Controlling the pattern 12 may be desirable to direct heat energy to increase the temperature of selected portions of the area 14 while maintaining the temperature of or preventing heating other portions of the area 14, as will be made apparent by the example applications for the system 10 given below.

The system 10 may include an infrared (IR) light source 16 operable to emit infrared light as indicated by arrows 18, hereafter often IR light 18. The IR light source 16 may be any kind source of IR light, for example an incandescent type IR bulb, quartz or ceramic type IR heater elements, or an IR light emitting diode. While FIG. 1 suggests that the infrared light source 16 is electrically powered, infrared heater elements that burn fuel such as propane or natural gas may also be suitable. Preferably, infrared light emitted by the IR light source 16 is directed or focused in a particular direction as illustrated however an omnidirectional type light source may be used, and the omnidirectional source may be accompanied by a reflector (not shown).

The system 10 may include an electrowetting lens 20 arranged proximate to the IR light source 16 so the IR light 18 can pass through the lens 20 and towards the area 14. In general, electrowetting lenses, also known as liquid lenses, contain two fluids: an aqueous fluid, commonly referred to as the water layer and indicated as water 22; and a hydrophobic dielectric fluid, commonly referred to as the oil layer and indicated as oil 24. In general, the shape and/or angle of a water/oil interface 26 can be manipulated by applying a voltage to electrodes arranged about the electrowetting lens 20. If the IR light 18 is incident on the water/oil interface 26 at a non-normal angle as suggested in some instances, and the water 22 has a different index of refraction than the oil 24, then the IR light 18 may be refracted and so change direction as illustrated. In the non-limiting example in FIG. 1, the electrowetting lens 20 is illustrated as having six electrowetting prisms 30A-F. It will be recognized that the electrowetting lens 20 may include many more than six electrowetting prisms and the prisms may be arranged in a two-dimensional array. It should be recognized by those in the art that the index of refraction of the water 22 and the oil 24 for infrared light may be different than the index of refraction for visible light, and so the voltages applied to the lens 20 to vary the infrared light distribution pattern 12 into an area 14 may not be the same as the voltages necessary for controlling a distribution pattern of visible light into the area 14.

The system 10 may also include an electrowetting shutter 32 overlaying the electrowetting lens 20. FIG. 1 illustrates the shutter 32 and lens 20 as being separated, however this is only for the purpose of illustration and not limitation. The shutter 32 is similar to the lens 20 in that the shape of an oil region 34 surrounded by a water region 36 is manipulated by the application of an electric field to the shutter 32. In this non-limiting example, the shutter 32 is illustrated as having six electrowetting elements 38A-F. It will be recognized that the electrowetting lens 20 may include many more than six electrowetting elements and the elements may be arranged in a two-dimensional array. Furthermore, the number of prisms 30 forming the lens 20 is not necessarily the name as the number of elements 38 forming the shutter 32.

The main difference is that the oil region 34 in the shutter 32 is opaque and so generally blocks infrared light 18 if the electric field applied to an element is such that the oil region 34 is spread across a face of an element as illustrated by element 38D. As such, each element 38A may be independently operable to an opaque state where infrared light 18 from the infrared light source 16 is blocked from projecting into at least a portion of the area 14, as illustrated by element 38D. Each element 38 may also be independently operable to a transparent state where infrared light 18 passes through the electrowetting shutter 32, as illustrated by elements 38A-C and 38E-F. It should be noted that the oil regions 34 in elements 38A-C are substantially crowded into one end of the element such that the maximum amount of IR light 18 passes through elements 38A-C. In contrast, elements 38E-F are illustrated as being about half obstructed by the oil region 34, and so only a portion of the IR light 18 passes through the elements 38E-F. The oil region 34 may comprise carbon and so may appear to be black in color. In another embodiment, the oil region 34 may comprises Galinstan and so reflect any IR light back toward the IR light source 16. This reflected IR light may be redirected by a reflector (not shown) if present so that the IR light eventually passes through some other section if the shutter 32.

The system 10 may include an object detector 40 configured to detect an object 42 in the area 14. The non-limiting example in FIG. 1 suggests that the object detector 40 may be an optical device such as a camera. However, it will be recognized that for simply detecting the presence of an object, a contact pressure sensor, a light beam through the area, or many other ways of detecting the presence of an object would be suitable. The object 42 is illustrated as a regular shape only for the purpose of explanation. The object 42 may be a person, a plate containing food, a sauna, an outdoor walkway at risk of accumulating ice or snow, a part with a coating wet material in need of drying/curing, or anything that may benefit from being exposed to IR light having a particular IR light distribution pattern. If it is desired to know more than simply the presence of the object 42, the object detector 40 may be any of several suitable devices such as a camera capable of registering ultraviolet, visible, and/or infrared light, a electromagnetic wave type radar unit, a laser radar unit, an infrared detector, an ultrasonic transceiver, or any other type of device capable of detecting the presence of an object in or near the area 14.

The system 10 may include a controller configured to receive a detection signal 46 from the object detector 40. The detection signal 46 may communicate a simple binary signal (e.g. true/false) if the object detector 40 is a switch, or may communicate additional information such as a temperature of the object 42. The temperature of the object 42 may be based on a signal from a temperature sensor (not shown) in contact with the object 42, or a non-contacting infrared sensing device. As such, the controller 44 may be further configured to control the infrared light distribution pattern 12 based on an object temperature of the object 42. If the object detector 40 is an imaging type device, such as an infrared camera capable of determining a surface temperature of the object 42, the controller 44 may be configured to adjust the light distribution pattern based on a desired temperature of the object 42 so that the temperature of the object 42 is uniform over the surface of the object. Alternatively, the controller 44 may be configured adjust the infrared light distribution pattern 12 based on a desired temperature profile on a surface of the object 42 so one portion of the object 42 has a different temperature or receives a different amount of infrared energy than another portion.

The controller 44 may also be configured to output a lens signal 48 from a lens signal output 52 effective to operate the electrowetting lens 20, and output a shutter signal 50 from a shutter signal output 54 effective to operate the electrowetting shutter 32. In general, the signals to control the lens 20 and the shutter 32 are a variety of electrode voltage applied to electrodes on the lens 20 and the shutter 32 to operate the lens 20 and the shutter 32 as described above. By operating the lens 20 and the shutter 32, the controller 44 may control the infrared light distribution pattern 12 based on a location and or temperature of the object 42. In one embodiment, the IR light source 16 include a plurality of infrared sources (16A, 16B) that may be connected to a controller 44 so that the controller 44 can operate the IR light source 16 to be OFF, and so not emit IR light, or ON, and so emit IR light, some infrared sources ON and some infrared sources OFF, or operate the IR light source 16 at a reduced infrared light output level.

The controller 44 may include a processor 52 such as a microprocessor or other control circuitry as should be evident to those in the art. The controller 44 may include memory (not shown), including non-volatile memory, such as electrically erasable programmable read-only memory (EEPROM) for storing one or more routines, thresholds and captured data. The one or more routines may be executed by the processor to perform steps for processing signals received by the controller 44 and outputting control signal for the lens 20 and the shutter 32 as described herein. As such, the controller 44 may be configured to operate the electrowetting lens 20 in order to control the size, location, and intensity the infrared light distribution pattern 12 into the area 14 based on the location of the object 42 indicated by the object detector 40. The operation of the system 10 will now be further explained by way of non-limiting examples.

Figure 2:
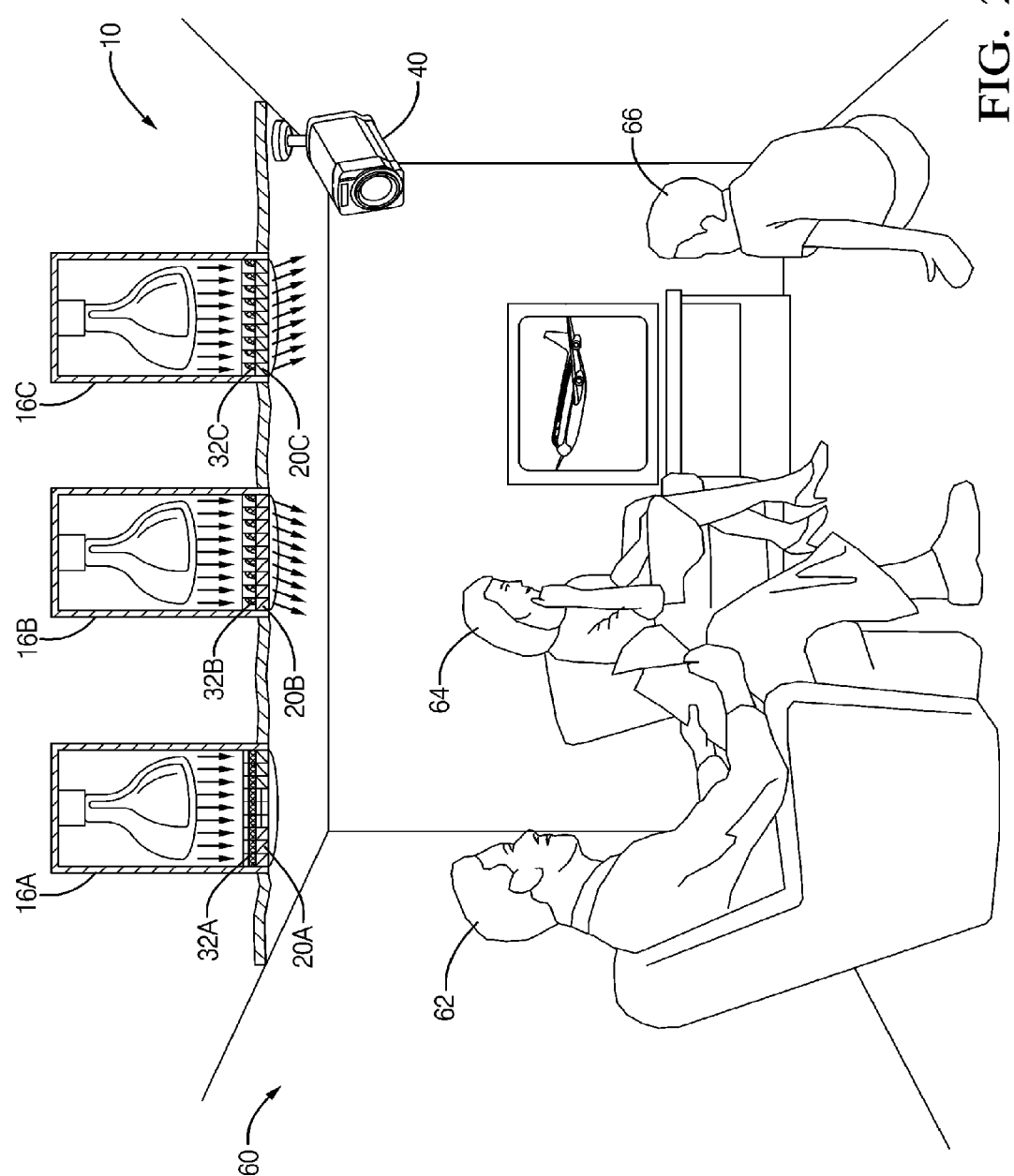
FIG. 2 is a perspective view of a building space equipped with the infrared light distribution pattern control system of FIG. 1 in accordance with one embodiment.

FIG. 2 illustrates a non-limiting example of a space inside a building, in this case a family room 60 in a home, equipped with the system 10. The controller 44 and associated signals 46, 48, and 50 are not shown only for the purpose of simplifying the illustration. A father 62 is residing proximate to a first IR light source 16A, a mother is residing proximate a second IR light source 16B, and a child 66 is residing proximate a third IR light source 16C. The object detector 40 in this example is an infrared camera generally configured to view the family room 60 and indicate the surface temperatures of the three persons (62, 64, 66) present in the family room. In this non-limiting example the controller 44 may determine that the father 62 has a surface temperature greater than a first threshold programmed into the controller 44 for a person residing proximate to the first IR light source 16A, and so operates a first shutter 32A to an opaque state so little or no infrared light from the first IR light source 16A is projected onto the father 62. The controller may further determine that the surface temperature of the mother 64 and the child 66 are below preprogrammed second and third thresholds, and so a second and third shutter 32B-C and a second and third lens 20B-C are operated so infrared light is projected onto the mother 64 and the child 66 by the second and third light sources 16B-C respectively. If, for example, the child 66 leaves the family room 60, the controller 44 may operate the third shutter 32C so little or no infrared light is projected from the third lens 20C. The IR light source 16 in this non-limiting example is illustrated as three separate IR sources (16A-C). However it should be appreciated that the IR light source 16 could alternatively be a wide area radiant heat panel able to provide enough IR light for the entire family room 60. For this case, multiple lenses (20A-C) and shutters (32A-C) may be arranged about the radiant heat panel so the amount of IR light received by each person in the family room 60 can be independently controlled. Adjusting the various thresholds and turning the system on and off may be by way of a remote control unit similar to those used for television remote controls.

Another example of how the system 10 could be used is now described, but not illustrated with a drawing. A sauna may be equipped with the system 10 so that the temperature experienced by different individuals in the sauna can be independently controlled. Furthermore, the system may be configured so that different portions of an individual's body may receive different amounts of IR light. For example, a person may desire that their feet and legs receive more IR light than their heads, and so various arrangements of lenses and shutters may be operated to provide an appropriate IR light distribution pattern.

Figure 3:
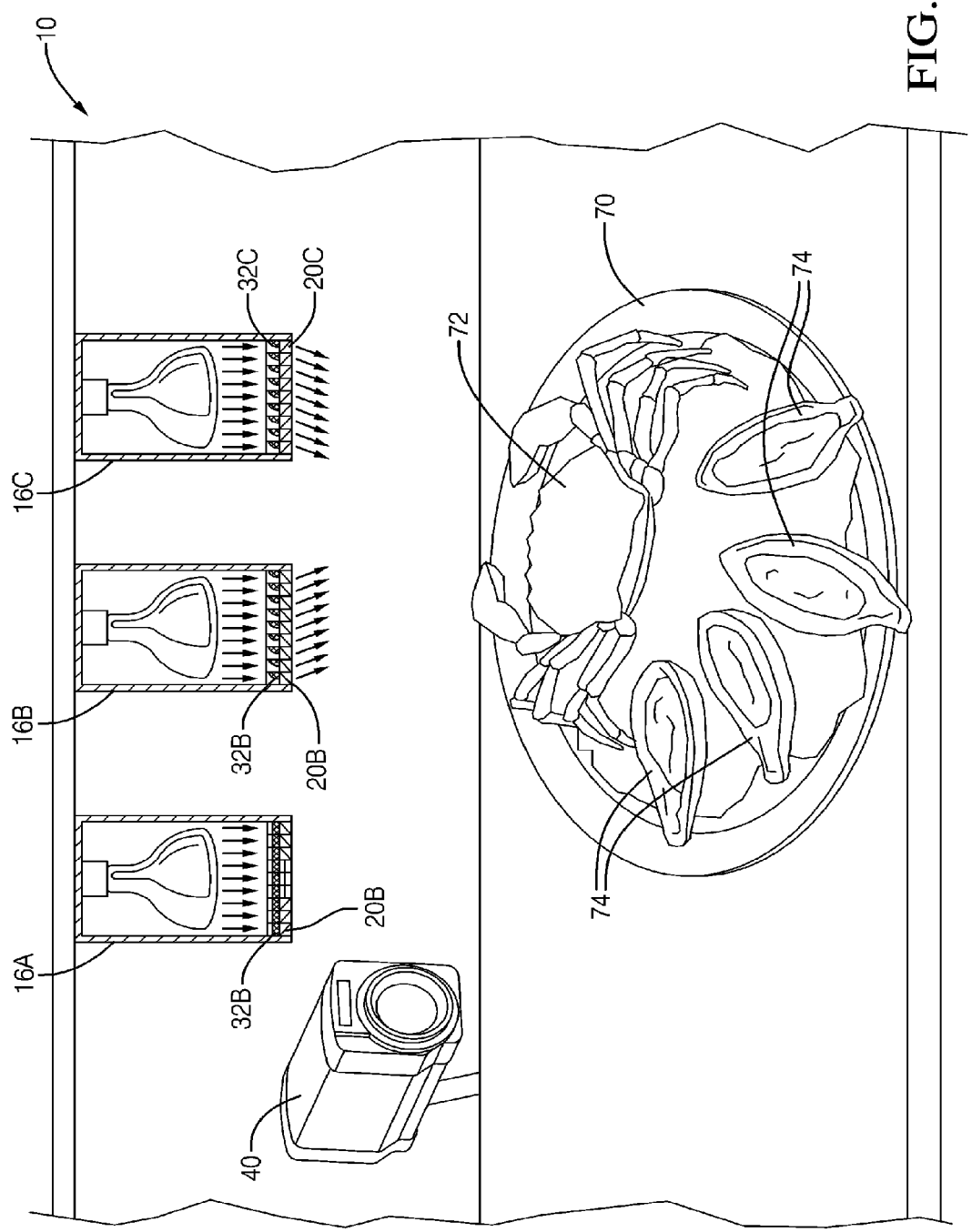
FIG. 3 is a perspective view of a food service area equipped with the infrared light distribution pattern control system of FIG. 1 in accordance with one embodiment.

FIG. 3 illustrates another non-limiting example of a use for the system 10. In this example a plate of food 70 may be kept warm while waiting to be served. The plate of food 70 is illustrated as including a crab 72 and chilled oysters 74. It may be desirable to keep the crab 72 warmed, but not increase the temperature of the oysters 74. The object detector 40 may provide an image signal to the controller that corresponds to an image of the plate of food. The controller 44 may be configured to analyze the image signal from the object detector and direct IR light only towards objects having a temperature greater than some threshold. As such, the system 10 may direct IR light toward the crab 72, but also avoid projecting IR light onto the oysters 74.

Another example of how the system 10 could be used is now described, but not illustrated with a drawing. A manufacturing system may be equipped with the system 10 so that a curing temperature of a coating applied to the object 42 may controlled. Furthermore, the system may be configured so that as the coating dries or cures, the IR light distribution pattern 12 can be modified so as to minimize energy usage while assuring that the coating is completely dried or cured. For example, the object detector may be used to determine an optical characteristic such as emissivity in order to determine if the coating is dried or cured.

Referring again to FIG. 1, the infrared light source 16 may be formed of a plurality of infrared sources 16A-B. The electrowetting lens 20 may be formed of a plurality of electrowetting prisms 30A-F. The electrowetting shutter 32 may be formed of a plurality of electrowetting elements 38A-F. The prisms and elements may be arranged so each of the electrowetting prisms 30A-F and electrowetting elements 38A-F is associated with a particular infrared source such that the infrared light emitted by a particular infrared source is directed toward a particular electrowetting prism and a particular electrowetting element. This arrangement provides for the IR light 18 from a single light source to be selectively distributed over the area 14, or focused on a relatively small portion of the area 14 as illustrated in FIG. 1.

Figure 4:
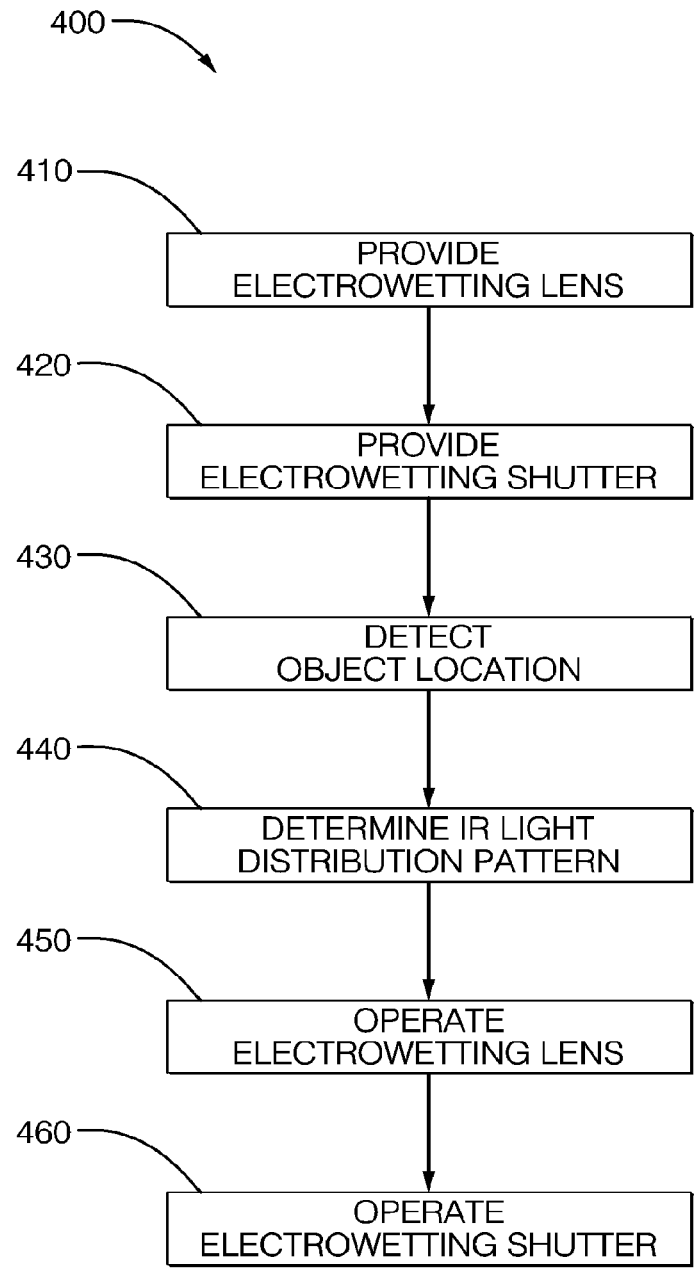
FIG. 4 is a flow chart of a method for controlling an infrared light distribution pattern.

FIG. 4 illustrates a method 400 for controlling an infrared light distribution pattern. The method 400 may include the step of providing an infrared light source 16 operable to emit infrared light 18. The particular type of source selected may be based on a desire for a particular band of wavelengths of IR light, or may be selected based on the amount of infrared energy needed for the application.

Step 410, PROVIDE ELECTROWETTING LENS, may include providing an electrowetting lens 20 operable to vary an infrared light distribution pattern 12 of infrared light 18 from the infrared light source 16 arriving in an area 14.

Step 420, PROVIDE ELECTROWETTING SHUTTER, may include providing an electrowetting shutter 32 operable to selectively block the infrared light 18 from projecting into at least a portion of the area 14.

Step 430, DETECT OBJECT LOCATION, may include detecting an object location of an object 42.

Step 440, DETERMINE LIGHT DISTRIBUTION PATTERN, may include determining an infrared light distribution pattern 12 based on the object location. The step 440 may also include determining the infrared light distribution pattern 12 based on an object temperature. The step 440 may also include determining the infrared light distribution pattern 12 based on a desired temperature of the object 42.

Step 450, OPERATE ELECTROWETTING LENS, may include outputting a lens signal 48 suitable to cause appropriate voltages to be applied to the lens 20 in order to establish a desired infrared light distribution pattern 12.

Step 460, OPERATE ELECTROWETTING SHUTTER, may include outputting a shutter signal 50 suitable to cause appropriate voltages to be applied to the shutter 32. As such, the electrowetting lens 20 and the electrowetting shutter 32 may be operated in order to control the infrared light distribution pattern 12 in the area 14.

While this invention has been described in terms of the preferred embodiments thereof, it is not intended to be so limited, but rather only to the extent set forth in the claims that follow.

We claim:

1. A system for controlling an infrared light distribution pattern, said system comprising:

an electrowetting lens arranged proximate to an infrared light source, and operable to vary a distribution pattern of infrared light from the infrared light source into an area;

an electrowetting shutter overlaying the electrowetting lens, and operable to an opaque state where infrared light from the infrared light source is blocked from projecting into at least a portion of the area, and operable to a transparent state where infrared light passes through the electrowetting shutter;

an object detector configured to detect an object in the area; and a controller configured to receive a detection signal from the object detector, and operate the electrowetting lens and the electrowetting shutter in order to control the infrared light distribution pattern based on a location of the object.

2. The system in accordance with claim 1, wherein the controller is further configured to control the infrared light distribution pattern based on an object temperature.

3. The system in accordance with claim 2, wherein the object detector is further configured to detect the object temperature, and the controller is configured to adjust the infrared light distribution pattern based on a desired temperature of the object.

4. The system in accordance with claim 3, wherein the object detector is an optical device configured to detect a surface temperature of the object, and the controller is configured to adjust the infrared light distribution pattern based on a desired temperature profile on a surface of the object.

5. The system in accordance with claim 1, wherein the system is configured to control the infrared light distribution pattern toward a person.

6. The system in accordance with claim 5, wherein the person is residing in one of a sauna, a vehicle interior, and a building space.

7. The system in accordance with claim 1, wherein the system is configured to control the infrared light distribution pattern in a food service area.

8. The system in accordance with claim 1, wherein the electrowetting lens comprises a plurality of electrowetting prisms.

9. The system in accordance with claim 1, wherein the electrowetting shutter comprises a plurality of electrowetting elements.

10. The system in accordance with claim 1, wherein the system further comprises an infrared light source operable to emit infrared light toward the area.

11. The system in accordance with claim 10, wherein the infrared light source comprises a plurality of infrared sources.

12. The system in accordance with claim 11, wherein the electrowetting lens comprises a plurality of electrowetting prisms, and the electrowetting shutter comprises a plurality of electrowetting elements, wherein each of the electrowetting prisms and electrowetting elements is associated with a particular infrared light source such that the infrared light emitted by a particular infrared source is directed toward a particular electrowetting prism and a particular electrowetting element.

13. A controller for an infrared light distribution pattern control system configured to selectively illuminate an area with infrared light, said controller comprising:

a lens signal output configured to control an electrowetting lens operable to vary a infrared light distribution pattern of infrared light from an infrared light source into an area;

a shutter signal output configured to control an electrowetting shutter operable to selectively block infrared light from the infrared light source;

an input configured to receive a detection signal from an object detector operable to detect a location of an object in the area; and a processor configured to determine the lens signal and the shutter signal based on the detection signal in order to control the infrared light distribution pattern in the area based on the location of the object.

14. The controller in accordance with claim 13, wherein the wherein the object detector is also operable to detect an object temperature of the object, and the controller is further configured to control the infrared light distribution pattern based on the object temperature.

15. The controller in accordance with claim 13, wherein the controller is further configured to control the infrared light source.

16. A method for controlling an infrared light distribution pattern, said method comprising:

providing an infrared light source operable to emit infrared light;

providing an electrowetting lens operable to vary a distribution pattern of infrared light from the infrared light source arriving in an area;

providing an electrowetting shutter operable to selectively block the infrared light from projecting into at least a portion of the area;

detecting an object location of an object;

determining an infrared light distribution pattern based on the object location; and operating the electrowetting lens and the electrowetting shutter in order to control the infrared light distribution pattern in the area.

17. The method in accordance with claim 16, wherein determining the infrared light distribution pattern is also based on an object temperature.

18. The method in accordance with claim 17, wherein determining the infrared light distribution pattern is also based on a desired temperature of the object.

* * * * *